(12) United States Patent
Lee et al.

(10) Patent No.: US 9,865,864 B2
(45) Date of Patent: Jan. 9, 2018

(54) RECHARGEABLE BATTERY

(71) Applicant: Samsung SDI Co., Ltd., Yongin-si, Gyeonggi-do (KR)

(72) Inventors: Chi-Young Lee, Yongin-si (KR); Myung-Jae Jang, Yongin-si (KR); Seung-Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 2 days.

(21) Appl. No.: 14/925,808

(22) Filed: Oct. 28, 2015

(65) Prior Publication Data

US 2016/0260961 A1 Sep. 8, 2016

(30) Foreign Application Priority Data

Mar. 2, 2015 (KR) .................. 10-2015-0029333

(51) Int. Cl.
*H01M 2/30* (2006.01)
*H01M 2/34* (2006.01)
*H01M 2/12* (2006.01)
*H01M 10/04* (2006.01)

(52) U.S. Cl.
CPC ......... *H01M 2/345* (2013.01); *H01M 2/1241* (2013.01); *H01M 2/30* (2013.01); *H01M 10/0431* (2013.01)

(58) Field of Classification Search
CPC ................................ H01M 2/30; H01M 2/345
See application file for complete search history.

(56) References Cited

U.S. PATENT DOCUMENTS

| 8,748,030 | B2 | 6/2014 | Byun |
| 2011/0039136 | A1 | 2/2011 | Byun et al. |
| 2011/0135976 | A1* | 6/2011 | Byun ............... H01M 2/04 429/56 |
| 2012/0052349 | A1* | 3/2012 | Kim ............... H01M 2/1061 429/94 |

FOREIGN PATENT DOCUMENTS

| KR | 10-2011-0017820 A | 2/2011 |
| KR | 10-2011-0134844 A | 12/2011 |

* cited by examiner

*Primary Examiner* — Olatunji Godo
(74) *Attorney, Agent, or Firm* — Knobbe Martens Olson & Bear LLP (57) ABSTRACT

A rechargeable battery that simplifies a structure that implements an external short circuit and that reduces a production cost is provided. The rechargeable battery includes: an electrode assembly that is formed by spiral-winding a first electrode and a second electrode that are disposed at respective surfaces of a separator interposed therebetween; a case that houses the electrode assembly; a cap plate that closes and seals an opening of the case; a first electrode terminal that is connected to the first electrode and that is installed in an insulation state in the cap plate; a second electrode terminal that is connected to the second electrode and that is electrically connected to the cap plate; and a vent plate that is installed in a vent hole of the cap plate and that is short-circuited with the first electrode terminal when the vent hole is opened.

16 Claims, 7 Drawing Sheets

RECHARGEABLE BATTERY

RELATED APPLICATIONS

This application claims priority to and the benefit of Korean Patent Application No. 10-2015-0029333 filed in the Korean Intellectual Property Office on Mar. 2, 2015, the entire contents of which are incorporated herein by reference.

BACKGROUND

Field

The present invention relates to a rechargeable battery that discharges internal pressure that reaches a predetermined value.

Description of the Related Art

A rechargeable battery can be repeatedly charged and discharged, unlike a primary battery. A rechargeable battery of a small capacity is used for a small portable electronic device like a mobile phone or a laptop computer or a camcorder, and a rechargeable battery of a large capacity is used as a power source for driving a motor of a hybrid vehicle and an electric vehicle.

For example, a rechargeable battery includes an electrode assembly that performs a charge and discharge operation, a case that houses the electrode assembly and an electrolyte solution, a cap plate that is coupled to an opening of the case, and an electrode terminal that is connected to the electrode assembly to be installed in the cap plate.

In order to discharge an internal pressure in the case, the cap plate includes a vent hole, has a vent plate in the vent hole, and has an external short circuit unit, which is an overcharge safety device. The external short circuit unit has a connection plate of a mutual insulation state and a membrane, and thus when an internal pressure increases due to overcharge, the external short circuit unit short-circuits an inverted membrane from the connection plate.

The connection plate is connected to a negative terminal, and the membrane is connected to a cap plate that is electrically connected to a positive terminal. Therefore, the membrane is inverted to contact the connection plate and thus safely discharges a current that is charged in an electrode assembly. Because such a rechargeable battery has a vent hole, a vent plate, and an external short circuit unit, the rechargeable battery has a complex structure and an increased production cost.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide a rechargeable battery having advantages of simplifying a structure that implements an external short circuit and reduces production cost.

An exemplary embodiment of the present invention provides a rechargeable battery including: an electrode assembly that includes a first electrode and a second electrode that are disposed at respective surfaces of a separator interposed therebetween; a case having an opening and a vent hole that houses the electrode assembly; a cap plate that closes and seals the opening of the case; a first electrode terminal that is connected to the first electrode and that is installed in an insulation state in the cap plate; a second electrode terminal that is connected to the second electrode and that is electrically connected to the cap plate; and a vent plate that is installed in the vent hole of the cap plate and that is short-circuited with the first electrode terminal when the vent hole is opened.

The first electrode terminal may include: a rivet terminal that is connected to the first electrode and that is installed by interposing a gasket in a terminal hole in the cap plate; and a plate terminal that is disposed by interposing an insulating member at the outside of the cap plate to be connected to the rivet terminal, wherein the plate terminal may be extended onto the vent hole to maintain a state that it is separated from the vent plate.

The vent plate may be integrally formed with the cap plate in the vent hole.

The vent plate may set a revolving hinge in a width direction of the cap plate at the first electrode terminal side, and may have a notch that is formed in a length direction of the cap plate at both sides of a width direction of the cap plate and be formed in a width direction to be connected at the opposite side of the revolving hinge.

The notch may be formed at an outer surface of the vent plate.

The plate terminal may have an inclined surface that is obliquely formed from a lower surface of the plate terminal to a side surface so as to surface contact the opened vent plate.

The vent plate may set a revolving hinge in a width direction of the cap plate at the first electrode terminal side and may have a notch that is formed in a length direction of the cap plate at both sides of a width direction of the cap plate and that is formed in a width direction to be connected at the opposite side of the revolving hinge, and the notch may be formed at an inner surface of the vent plate.

The vent plate may set a revolving curved portion in a width direction of the cap plate at the first electrode terminal side, and may have a notch that is formed in a length direction of the cap plate at both sides of a width direction of the cap plate and that is formed in a width direction to be connected at the opposite side of the curved portion.

The revolving open curved portion may have an elastic force that revolves the vent plate to the outside of the cap plate.

The revolving open curved portion may be formed concavely toward the outside of the cap plate.

The notch may be formed at an inner surface of the vent plate.

According to an exemplary embodiment of the present invention, when a vent plate that is electrically connected to a second electrode terminal is opened, by enabling it to be short-circuited from a first electrode terminal, even in a state in which a separate element other than the vent plate is not provided, when internal pressure is discharged, by enabling an external short circuit, production cost of a rechargeable battery can be reduced.

DETAILED DESCRIPTION OF CERTAIN INVENTIVE EMBODIMENTS

The present invention will be described more fully hereinafter with reference to the accompanying drawings, in which exemplary embodiments of the invention are shown. As those skilled in the art would realize the described embodiments may be modified in various different ways all without departing from the spirit or scope of the present invention. The drawings and description are to be regarded as illustrative in nature and not restrictive. Like reference numerals designate like elements throughout the specification.

Figure 1:
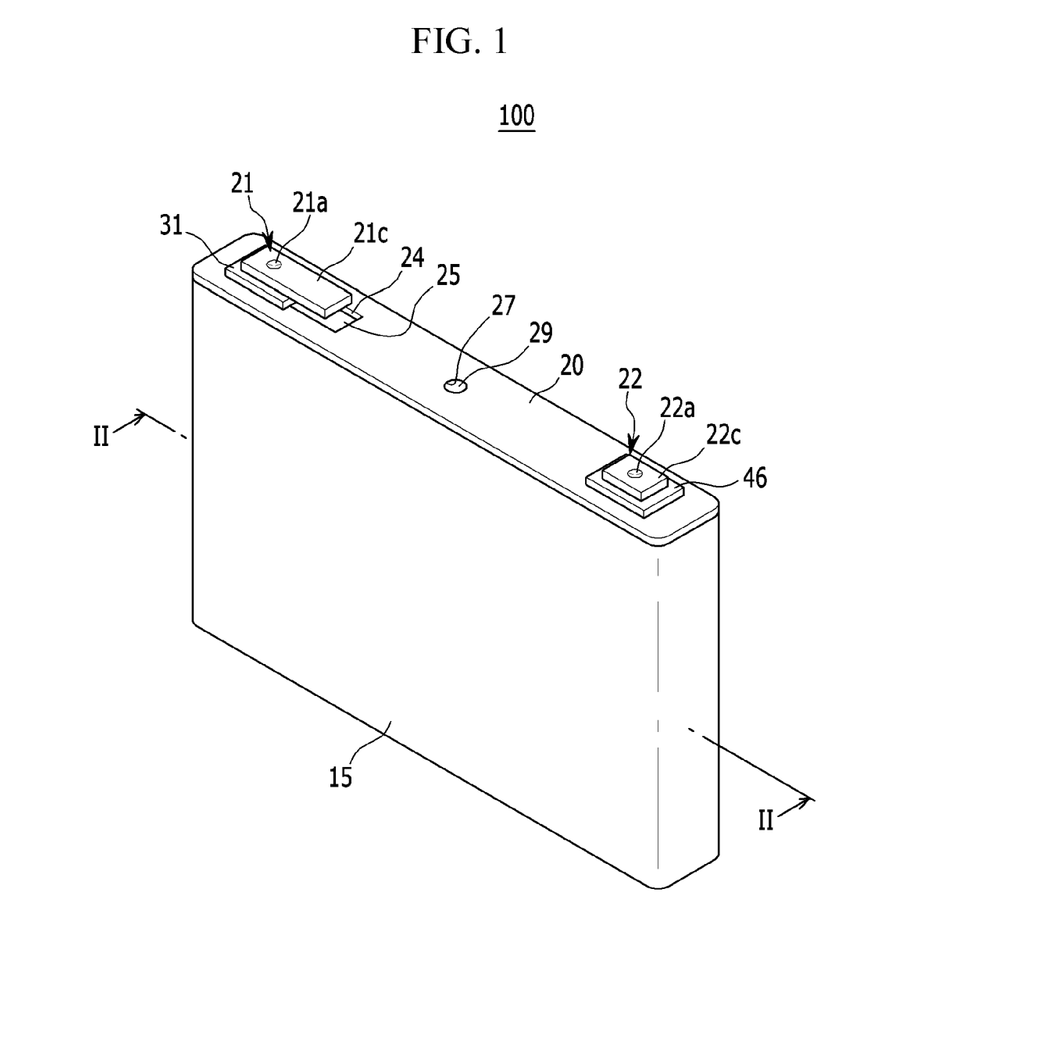
FIG. 1 is a perspective view illustrating a rechargeable battery according to a first exemplary embodiment of the present invention.
Figure 2:
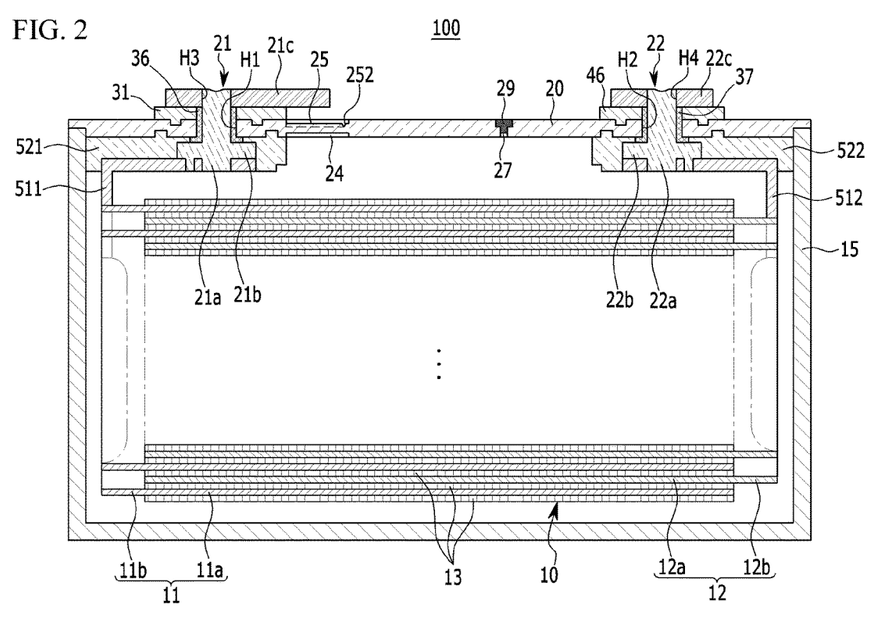
FIG. 2 is a cross-sectional view illustrating the rechargeable battery taken along line II-II of FIG. 1.

FIG. 1 is a perspective view illustrating a rechargeable battery according to a first exemplary embodiment of the present invention, and FIG. 2 is a cross-sectional view illustrating the rechargeable battery taken along line II-II of FIG. 1. Referring to FIGS. 1 and 2, a rechargeable battery 100 according to the first exemplary embodiment includes an electrode assembly 10 that charges and discharges a current, a case 15 that houses the electrode assembly 10 and an electrolyte solution, a cap plate 20 that is coupled to an opening of the case 15, and a first electrode terminal 21 and a second electrode terminal 22 that are respectively installed in terminal holes H1 and H2 of the cap plate 20.

For example, the electrode assembly 10 is formed by disposing a first electrode and a second electrode (e.g., a negative electrode 11 and a positive electrode 12) at respective surfaces of a separator 13, which is an insulator, and by spirally-winding the negative electrode 11, the separator 13, and the positive electrode 12 in a jelly roll state.

The negative electrode 11 and the positive electrode 12 respectively include coated regions 11a and 12a that apply an active material to a current collector of a metal foil, and uncoated regions 11b and 12b, respectively, that are formed with an exposed current collector because an active material is not applied thereto.

The uncoated region 11b of the negative electrode 11 is formed in an end portion of one side of the negative electrode 11 along the spiral-wound negative electrode 11. The uncoated region 12b of the positive electrode 12 is formed in an end portion of one side of the positive electrode 12 along the spiral-wound positive electrode 12. The uncoated regions 11b and 12b are disposed at opposite ends of the electrode assembly 10.

The case 15 is formed as an approximate cuboid to set a space that houses the electrode assembly 10 therein. An opening of the case 15 is formed at one side of the cuboid to enable the electrode assembly 10 to be inserted from the outside to an internal space.

The cap plate 20 is installed in an opening of the case 15 to close and seal the case 15. For example, the case 15 and the cap plate 20 are made of aluminum to be welded to each other. That is, after the electrode assembly 10 is inserted into the case 15, the cap plate 20 is welded to an opening of the case 15.

Further, the cap plate 20 has at least one opening and has, for example, terminal holes H1 and H2 and a vent hole 24. The first electrode terminal 21 and the second electrode terminal 22 are installed in the terminal holes H1 and H2, respectively, of the cap plate 20 to be electrically connected to the electrode assembly 10.

That is, the first electrode terminal 21 and the second electrode terminal 22 are electrically connected to the negative electrode 11 and the positive electrode 12, respectively, of the electrode assembly 10. Therefore, the electrode assembly 10 is drawn outside of the case 15 through the first electrode terminal 21 and the second electrode terminal 22. Although not shown, the first and second electrode terminals may be electrically connected to a positive electrode and a negative electrode, respectively, of an electrode assembly.

The first electrode terminal 21 and the second electrode terminal 22 include rivet terminals 21a and 22a that are electrically connected to the electrode assembly 10 and that are installed to penetrate the terminal holes H1 and H2, and plate terminals 21c and 22c that are disposed at the outside of the cap plate 20 to be fastened to the rivet terminals 21a and 22a, respectively.

The plate terminals 21c and 22c have through-holes H3 and H4, respectively. The rivet terminals 21a and 22a penetrate the terminal holes H1 and H2 at an upper end portion to be inserted into the through-holes H3 and H4, respectively. The first electrode terminal 21 and the second electrode terminal 22 further include flanges 21b and 22b that are integrally widely formed in the rivet terminals 21a and 22a, respectively, at the inside of the cap plate 20.

At the first electrode terminal 21 side that is connected to the negative electrode 11, an external insulation member 31 that is interposed between the plate terminal 21c and the cap plate 20 electrically insulates the plate terminal 21c and the cap plate 20. That is, the cap plate 20 maintains a state that it is electrically insulated from the electrode assembly 10 and the negative electrode 11.

By riveting or welding an upper end portion to couple the insulation member 31 and the plate terminal 21c to the upper end portion of the rivet terminal 21a, the insulation member 31 and the plate terminal 21c are fastened to the upper end portion of the rivet terminal 21a. The plate terminal 21c is installed at the outside of the cap plate 20 with the insulation member 31 interposed therebetween.

At the second electrode terminal 22 side that is connected to the positive electrode 12, a conductive top plate 46 that is interposed between the plate terminal 22c and the cap plate 20 electrically connects the plate terminal 22c and the cap plate 20. That is, the cap plate 20 maintains a state that it is electrically connected to the positive electrode 12 of the electrode assembly 10.

By riveting or welding an upper end portion to couple the top plate 46 and the plate terminal 22c to the upper end portion of the rivet terminal 22a, the top plate 46 and the plate terminal 22c are fastened to the upper end portion of the rivet terminal 22a. The plate terminal 22c is installed at the outside of the cap plate 20 with the top plate 46 interposed therebetween to be electrically connected to the cap plate 20.

Gaskets 36 and 37 are installed between the rivet terminals 21a and 22a of the first electrode terminal 21 and the second electrode terminal 22 and an inner surface of the terminal holes H1 and H2, respectively, of the cap plate 20 to seal and electrically insulate between the rivet terminals 21a and 22a, respectively, and the cap plate 20.

The gaskets 36 and 37 are further extended between the flanges 21b and 22b and the inside of the cap plate 20 to further seal and electrically insulate between the flanges 21b and 22b and the cap plate 20. That is, by installing the first electrode terminal 21 and the second electrode terminal 22 in the cap plate 20, the gaskets 36 and 37 prevent an electrolyte solution from leaking through the terminal holes H1 and H2.

Lead tabs 511 and 512 electrically connect the first electrode terminal 21 and the second electrode terminal 22 to the uncoated regions 11b and 12b of the negative electrode 11 and the positive electrode 12, respectively, of the electrode assembly 10. That is, by caulking a lower end portion by coupling the lead tabs 511 and 512 to the lower end portion of the rivet terminals 21a and 22a, while the lead tabs 511 and 512 are supported to the flanges 21b and 22b, the lead tabs 511 and 512 are connected to the lower end portion of the rivet terminals 21a and 22a, respectively.

Internal insulation members 521 and 522 are each installed between the lead tabs 511 and 512 and the cap plate 20 to electrically insulate the lead tabs 511 and 512 and the cap plate 20. Further, the insulation members 521 and 522 are coupled to the cap plate 20 at one side and enclose the lead tabs 511 and 512, the rivet terminals 21a and 22a, and the flanges 21b and 22b at the other side, thereby stabilizing a connection structure thereof.

The cap plate 20 further includes an electrolyte injection opening 27. The electrolyte injection opening 27 enables injection of an electrolyte solution into the case 15. After the electrolyte solution is injected, the electrolyte injection opening 27 is sealed by a seal stopper 29.

Figure 3:
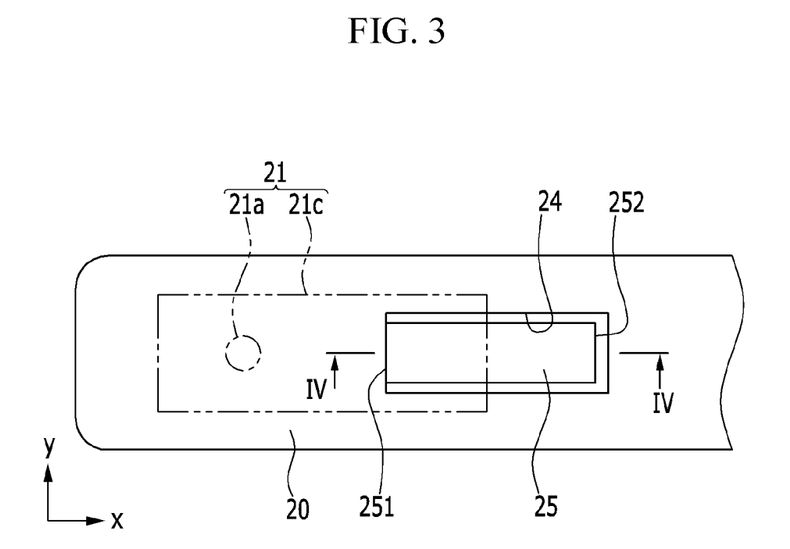
FIG. 3 is a top plan view of a cap plate illustrating a periphery of a first electrode terminal and a vent hole of FIG. 2.
Figure 4:
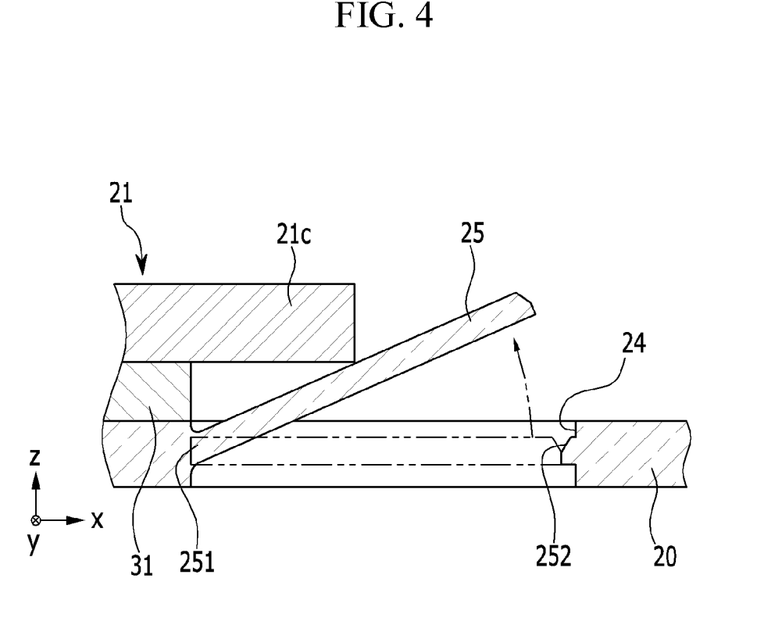
FIG. 4 is a cross-sectional view illustrating a vent plate in an opened state taken along line IV-IV of FIG. 3.

FIG. 3 is a top plan view of a cap plate illustrating a periphery of a first electrode terminal and a vent hole of FIG. 2, and FIG. 4 is a cross-sectional view illustrating a vent plate of an opened state taken along line IV-IV of FIG. 3.

Referring to FIGS. 3 and 4, the vent hole 24 is formed to discharge an internal pressure and a generated gas of the rechargeable battery 100 to be closed and sealed with a vent plate 25. In a first exemplary embodiment, the vent plate 25 is integrally formed with the cap plate 20 in the vent hole 24.

When the vent plate 25 is opened, the vent hole 24 is provided at the adjacent side of the first electrode terminal 21 in the cap plate 20 so that the vent hole 24 is short-circuited from the first electrode terminal 21. The first electrode terminal 21 is provided within an open trajectory range of the vent plate 25.

Further, the plate terminal 21c of the first electrode terminal 21 is extended onto the vent hole 24 to maintain a separated state from the vent plate 25. Therefore, even when the vent plate 25 is not completely opened, but is partially opened, the vent plate 25 may be short-circuited from the plate terminal 21c.

That is, the insulating member 31 is provided at the adjacent side of the vent hole 24 to separate the plate terminal 21c and the vent plate 25. Therefore, when the rechargeable battery 100 normally drives, the vent plate 25 maintains an insulating state from the plate terminal 21c, and when an internal pressure of the rechargeable battery 100 reaches a predetermined pressure, the vent plate 25 may be short-circuited from the plate terminal 21c while opening the vent hole 24.

As the vent plate 25 that is electrically connected to the second electrode terminal 22 and the cap plate 20 is opened to be short-circuited with the plate terminal 21c of the first electrode terminal 21, in a state that it does not have a separate element other than the vent plate 25, when internal pressure of the rechargeable battery 100 is discharged, the external short circuit is implemented. Therefore, a production cost of the rechargeable battery 100 for implementing the external short circuit can be reduced.

For this purpose, the vent plate 25 has a revolving hinge 251 and a notch 252 that induces cutout. The revolving hinge 251 is set in a width direction (y-axis direction) of the cap plate 20 at the first electrode terminal 21 side, and the notch 252 is formed to open the vent plate 25 about the revolving hinge 251. That is, in the quadrangular vent hole 24 and vent plate 25, because the notch 252 is formed at three sides, at one side in which a notch is not formed, the revolving hinge 251 is set.

For example, the notch 252 may be formed at an outer surface of the vent plate 25. Further, the notch 252 is formed in a length direction (x-axis direction) of the cap plate 20 at both sides of a width direction (y-axis direction) of the cap plate 20, and is formed in a width direction (y-axis direction) to be connected at the opposite side of the revolving hinge 251.

Therefore, when an internal pressure of the rechargeable battery 100 reaches a predetermined value, the vent plate 25 is cut out at the notch 252 of a portion except at the revolving hinge 251, and opens the vent hole 24 while revolving about the revolving hinge 251.

The vent plate 25 that is opened by internal pressure contacts the plate terminal 21c of the first electrode terminal 21 to implement the external short circuit of the rechargeable battery 100. Therefore, a current that is charged at the electrode assembly 10 of the rechargeable battery 100 can be safely discharged at the outside of the electrode assembly 10.

Hereinafter, various exemplary embodiments of the present invention will be described. In the following description, constituent elements identical to or corresponding to those of a first exemplary embodiment will be omitted and only dissimilar constituent elements will be described.

Figure 5:
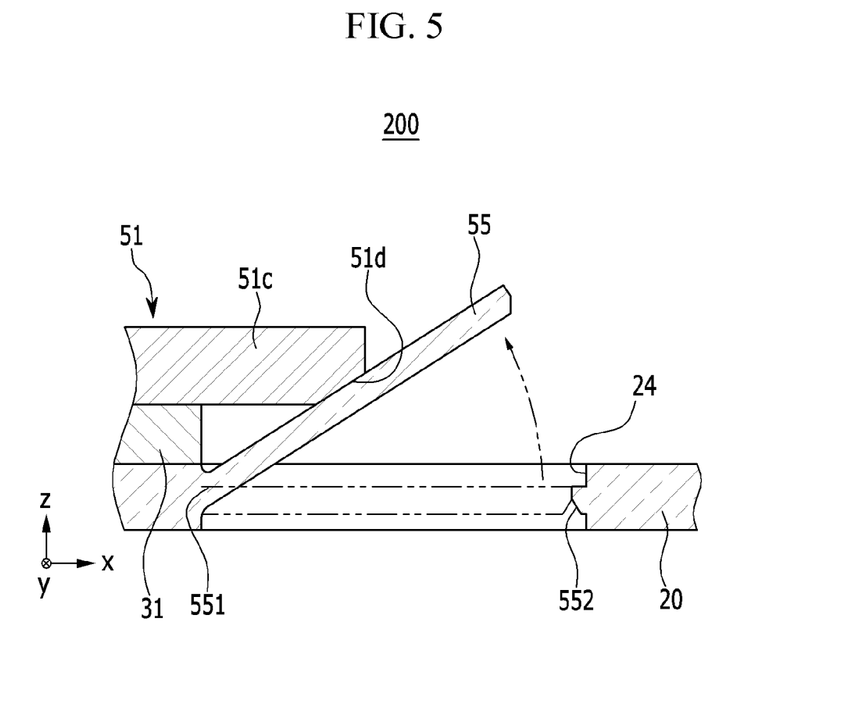
FIG. 5 is a cross-sectional view illustrating a vent plate in an opened state in a rechargeable battery according to a second exemplary embodiment of the present invention.

FIG. 5 is a cross-sectional view illustrating a vent plate of an opened state in a rechargeable battery according to a second exemplary embodiment of the present invention. Referring to FIG. 5, in a rechargeable battery 200 of the second exemplary embodiment, in order to surface contact an opened vent plate 55, a plate terminal 51c of a first electrode terminal 51 has an inclined surface 51d that is obliquely formed from a lower surface of the plate terminal 51c to a side surface.

The vent plate 55 has a revolving hinge 551 and a notch 552. For example, the notch 552 may be formed at an inner surface of the vent plate 55. As the notch 552 is formed at an inner surface of the vent plate 55, the notch 552 is directly exposed to internal gas and internal pressure, and thus when the internal pressure reaches a predetermined value, the notch 552 may be easily cut out.

Further, the notch 552 is formed in a length direction (x-axis direction) of a cap plate 20 at both sides of a width direction (y-axis direction) of the cap plate 20 and is formed in a width direction (y-axis direction) to be connected at the opposite side of the revolving hinge 551 (see the notch 252 of FIG. 3).

Therefore, when internal pressure of the rechargeable battery 200 reaches a predetermined value, the vent plate 55 is cut out in the notch 552 at a portion except for the revolving hinge 551, and opens the vent hole 24 while revolving about the revolving hinge 551.

The vent plate 55 that is opened by internal pressure contacts in a wide area with the inclined surface 51d of the plate terminal 51c of the first electrode terminal 51 to implement the external short circuit of the rechargeable battery 200. Therefore, a current that is charged in the electrode assembly 10 of the rechargeable battery 200 can be safely discharged at the outside of the electrode assembly 10 through the short circuit of a wide area.

Figure 6:
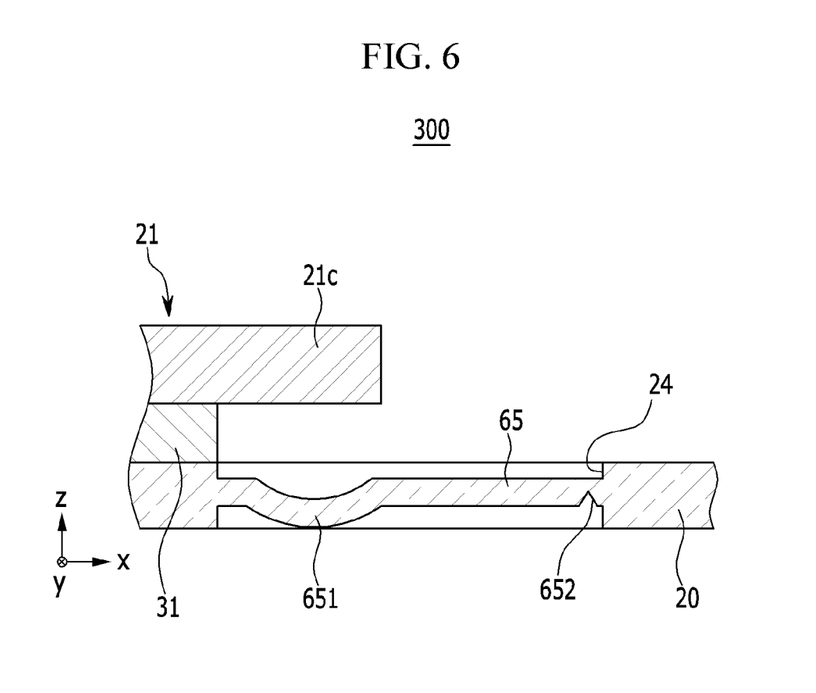
FIG. 6 is a cross-sectional view illustrating a vent plate in a closed state in a rechargeable battery according to a third exemplary embodiment of the present invention.
Figure 7:
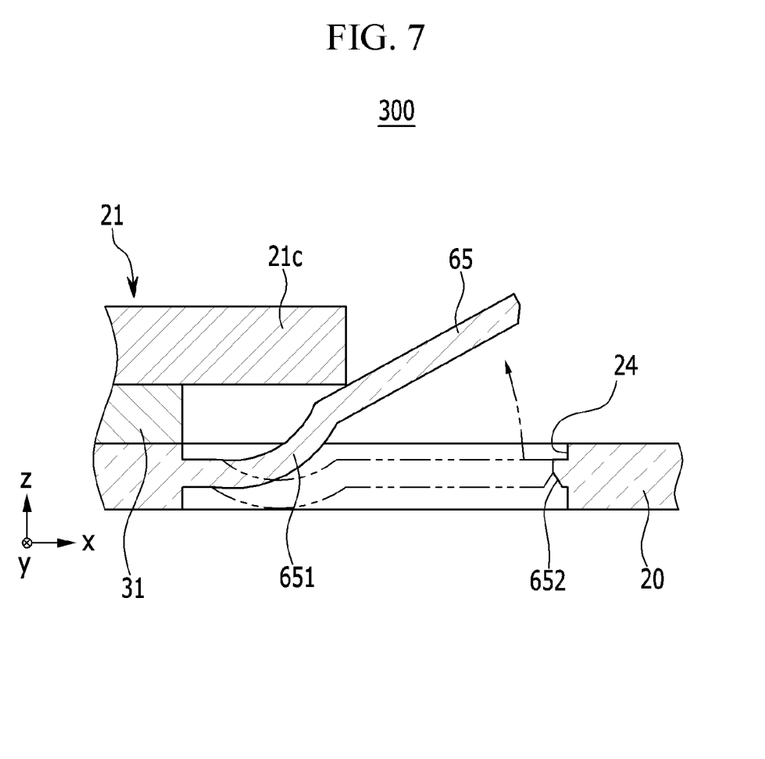
FIG. 7 is a cross-sectional view illustrating a vent plate of an opened state in the rechargeable battery of FIG. 6.

FIG. 6 is a cross-sectional view illustrating a vent plate of a closed state in a rechargeable battery according to a third exemplary embodiment of the present invention, and FIG. 7 is a cross-sectional view illustrating a vent plate of an opened state in the rechargeable battery of FIG. 6.

Referring to FIGS. 6 and 7, in a rechargeable battery 300 of the third exemplary embodiment, a vent plate 65 has a revolving curved portion 651 and a notch 652. The revolving curved portion 651 may be formed in a width direction (y-axis direction) of a cap plate 20 at the first electrode terminal 21 side.

For example, the revolving curved portion 651 may have an elastic force that revolves the vent plate 65 to the outside of the cap plate 20. An elastic force of the revolving curved portion 651 may securely maintain a state in which the vent plate 65 contacts a plate terminal 21c. For example, the revolving curved portion 651 may be concavely formed toward the outside of the cap plate 20.

Further, the notch 652 is formed in a length direction (x-axis direction) of the cap plate 20 at both sides of a width direction (y-axis direction) of the cap plate 20, and is formed in a width direction (y-axis direction) to be connected at the opposite side of the revolving curved portion 651 (see the notch 252 of FIG. 3). For example, the notch 652 may be formed at an inner surface of the vent plate 65.

Therefore, when an internal pressure of the rechargeable battery 300 reaches a predetermined value, the vent plate 65 is cut out in the notch 652 of a portion except for the revolving curved portion 651, and opens a vent hole 24 while revolving about the revolving curved portion 651.

The vent plate 65 that is opened by internal pressure contacts the plate terminal 21c of the first electrode terminal 21 to implement the external short circuit of the rechargeable battery 300. Therefore, a current that is charged in the electrode assembly 10 of the rechargeable battery 300 can be safely discharged at the outside of the electrode assembly 10 through the vent plate 65 and the plate terminal 21c.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
    an electrode assembly that includes a first electrode and a second electrode that are disposed at respective surfaces of a separator interposed therebetween;
    a case having an opening and a vent hole that houses the electrode assembly;
    a cap plate that closes and seals the opening of the case;
    a first electrode terminal that is connected to the first electrode and that is installed in an insulation state in the cap plate;
    a second electrode terminal that is connected to the second electrode and that is electrically connected to the cap plate; and
    a vent plate that is installed in the vent hole of the cap plate and that is short-circuited with the first electrode terminal when the vent hole is opened wherein the first electrode terminal is positioned over the vent plate and wherein the vent plate has a hinge and a notch wherein the hinge is interposed between the first electrode terminal and the notch wherein the notch is dimensioned so that the vent plate separates from the cap plate at a first pressure so that the vent plate rotates about the hinge such that an upper surface of the vent plate physically contacts the first electrode terminal.

2. The rechargeable battery of claim 1, wherein the cap plate includes a terminal hole wherein the first electrode terminal comprises:
    a rivet terminal that is connected to the first electrode and extends through the terminal hole and that is installed by interposing a gasket in the terminal hole; and
    a plate terminal that is disposed by interposing an insulating member at the outside of the cap plate to be connected to the rivet terminal,
    wherein the plate terminal is extended onto the vent hole to maintain a state that it is separated from the vent plate.

3. The rechargeable battery of claim 2, wherein the vent plate is integrally formed with the cap plate in the vent hole.

4. The rechargeable battery of claim 3, wherein the vent plate sets a revolving hinge in a width direction of the cap plate at the first electrode terminal side, and has a notch that is formed in a length direction of the cap plate at both sides of a width direction of the cap plate and is formed in a width direction to be connected at the opposite side of the revolving hinge.

5. The rechargeable battery of claim 4, wherein the notch is formed at an outer surface of the vent plate.

6. The rechargeable battery of claim 3, wherein the plate terminal has an inclined surface that is obliquely formed from a lower surface of the plate terminal to a side surface so as to surface contact the opened vent plate.

7. The rechargeable battery of claim 6, wherein the vent plate sets a revolving hinge in a width direction of the cap plate at the first electrode terminal side and has a notch that is formed in a length direction of the cap plate at both sides of a width direction of the cap plate and that is formed in a width direction to be connected at the opposite side of the revolving hinge, and
    the notch is formed at an inner surface of the vent plate.

8. The rechargeable battery of claim 3, wherein the vent plate sets a revolving curved portion in a width direction of the cap plate at the first electrode terminal side and has a notch that is formed in a length direction of the cap plate at both sides of a width direction of the cap plate and that is formed in a width direction to be connected at the opposite side of the curved portion.

9. The rechargeable battery of claim 8, wherein the revolving open curved portion has an elastic force that revolves the vent plate to the outside of the cap plate.

10. The rechargeable battery of claim 9, wherein the revolving open curved portion is formed concavely toward the outside of the cap plate.

11. The rechargeable battery of claim 9, wherein the notch is formed at an inner surface of the vent plate.

12. A battery comprising:
    an electrode assembly with a first and second electrode;
    a case having a cap plate wherein the cap plate includes a vent opening wherein the electrode assembly is positioned within the case;
    a first electrode terminal connected to the first electrode wherein the first electrode terminal extends outward of the cap plate wherein the first electrode terminal is insulated from the cap plate;

a vent plate that is formed to cover the vent opening of the cap plate, wherein the first electrode terminal is positioned over the vent plate and wherein the vent plate is formed to the cap plate such that the vent plate has a hinge and a notch wherein the hinge is interposed between the first electrode terminal and the notch and wherein the notch is dimensioned so that the vent plate deforms and opens the vent opening in response to a pre-determined pressure within the case so that the vent plate rotates about the hinge such that an upper surface of the vent plate contacts the first electrode terminal when opened in response to the pre-determined pressure.

13. The battery of claim 12 wherein the cap plates includes a terminal hole and wherein the first electrode comprises a rivet terminal that is connected to the first electrode and extends through the terminal hole;

a gasket that insulates the rivet terminal from the cap plate portions adjacent the terminal hole;

an insulating member;

a plate terminal wherein the insulating member is interposed between the outside of the cap plate and the plate terminal and the plate terminal is connected to the rivet terminal and wherein the rivet terminal extends into the vent hole with the insulating member being interposed in the vent hole.

14. The battery of claim 12, wherein the vent plate includes a curved surface and a groove such that when the predetermined pressure occurs within the case, the vent plate separates from the cap plate at the groove and pivots about the curved surface so as to contact the first electrode.

15. The battery of claim 14, wherein the curved surface extends from an inner surface of the cap plate inwards into the case.

16. The battery of claim 15, wherein the curved surface is contoured to bias the vent plate to open outward to contact the first electrode.

* * * * *